United States Patent
Hutton

(10) Patent No.: US 9,330,264 B1
(45) Date of Patent: May 3, 2016

(54) STATISTICAL ANALYTIC METHOD FOR THE DETERMINATION OF THE RISK POSED BY FILE BASED CONTENT

(71) Applicant: GLASSWALL (IP) LIMITED, London (GB)

(72) Inventor: Samuel Harrison Hutton, Herts (GB)

(73) Assignee: GLASSWALL (IP) LIMITED (GB)

( * ) Notice: Subject to any disclaimer, the term of this patent is extended or adjusted under 35 U.S.C. 154(b) by 0 days.

(21) Appl. No.: 14/600,431

(22) Filed: Jan. 20, 2015

Related U.S. Application Data

(60) Provisional application No. 62/084,832, filed on Nov. 26, 2014.

(51) Int. Cl.
  *G06F 21/57* (2013.01)
  *G06F 17/30* (2006.01)
  *H04L 29/06* (2006.01)

(52) U.S. Cl.
  CPC ........ *G06F 21/577* (2013.01); *G06F 17/30598* (2013.01); *H04L 63/1408* (2013.01); *G06F 2221/034* (2013.01)

(58) Field of Classification Search
  CPC ............ G06F 21/577; G06F 2221/034; H04L 63/1408
  USPC .......................................................... 726/25
  See application file for complete search history.

(56) References Cited

U.S. PATENT DOCUMENTS

| | | | |
|---|---|---|---|
| 5,050,212 A | 9/1991 | Dyson | |
| 5,649,095 A | 7/1997 | Cozza | |
| 5,655,130 A | 8/1997 | Dodge et al. | |
| 5,745,897 A | 4/1998 | Perkins et al. | |
| 5,832,208 A | 11/1998 | Chen et al. | |
| 5,951,698 A | 9/1999 | Chen et al. | |
| 6,144,934 A | 11/2000 | Stockwell et al. | |
| 6,336,124 B1 | 1/2002 | Alam et al. | |
| 6,401,210 B1 | 6/2002 | Templeton | |
| 6,493,761 B1 | 12/2002 | Baker et al. | |
| 6,697,950 B1 | 2/2004 | Ko | |
| 6,807,632 B1 | 10/2004 | Carpentier et al. | |
| 6,922,827 B2 | 7/2005 | Vasilik et al. | |
| 7,093,135 B1 | 8/2006 | Radatti et al. | |
| 7,225,181 B2 | 5/2007 | Tsuda | |
| 7,240,279 B1 | 7/2007 | Chartier et al. | |

(Continued)

FOREIGN PATENT DOCUMENTS

| DE | 10235819 A1 | 2/2004 |
|---|---|---|
| EP | 0751643 A1 | 1/1997 |

(Continued)

OTHER PUBLICATIONS

Apr. 13, 2006 Search Report in connection with counterpart British patent application No. GB0511749.4.

(Continued)

*Primary Examiner* — Dao Ho
(74) *Attorney, Agent, or Firm* — Marger Johnson

(57) ABSTRACT

A system and method for calculating a risk assessment for an electronic file is described. A database of checks, organized into categories, can be used to scan electronic files. The categories of checks can include weights assigned to them. An analyzer can analyze electronic files using the checks. Issues identified by the analyzer can be weighted using the weights to determine a risk assessment for the electronic file.

18 Claims, 12 Drawing Sheets

(56) References Cited

U.S. PATENT DOCUMENTS

| | | | |
|---|---|---|---|
| 7,269,733 B1 | 9/2007 | O'Toole, Jr. | |
| 7,496,963 B2 | 2/2009 | Shipp | |
| 7,607,172 B2 | 10/2009 | Zurko et al. | |
| 7,636,856 B2 | 12/2009 | Gheorghescu et al. | |
| 7,664,754 B2 | 2/2010 | Shipp | |
| 7,685,174 B2 | 3/2010 | Koestler | |
| 7,756,834 B2 | 7/2010 | Masters et al. | |
| 8,185,954 B2* | 5/2012 | Scales | G06F 21/56 713/154 |
| 8,533,840 B2* | 9/2013 | Redlich | G06F 21/6245 707/708 |
| 8,683,584 B1* | 3/2014 | Daswani | G06F 21/577 726/22 |
| 2002/0004908 A1 | 1/2002 | Galea | |
| 2002/0072926 A1 | 6/2002 | Morita et al. | |
| 2002/0073330 A1 | 6/2002 | Chandnani et al. | |
| 2002/0174185 A1 | 11/2002 | Rawat et al. | |
| 2002/0178396 A1 | 11/2002 | Wong et al. | |
| 2002/0184555 A1 | 12/2002 | Wong et al. | |
| 2003/0046128 A1* | 3/2003 | Heinrich | G06Q 40/08 705/7.28 |
| 2003/0079142 A1 | 4/2003 | Margalit et al. | |
| 2003/0079158 A1 | 4/2003 | Tower et al. | |
| 2003/0120949 A1* | 6/2003 | Redlich | C07K 14/70575 726/21 |
| 2003/0145213 A1 | 7/2003 | Carbone | |
| 2003/0163732 A1 | 8/2003 | Parry | |
| 2003/0163799 A1 | 8/2003 | Vasilik et al. | |
| 2003/0196104 A1* | 10/2003 | Baber | G06F 21/564 726/24 |
| 2003/0229810 A1 | 12/2003 | Bango | |
| 2004/0008368 A1 | 1/2004 | Plunkett et al. | |
| 2004/0049687 A1 | 3/2004 | Orsini et al. | |
| 2004/0054498 A1 | 3/2004 | Shipp | |
| 2004/0064515 A1 | 4/2004 | Hockey | |
| 2004/0181543 A1 | 9/2004 | Wu et al. | |
| 2004/0199594 A1 | 10/2004 | Radatti et al. | |
| 2004/0230903 A1 | 11/2004 | Elza et al. | |
| 2005/0071477 A1 | 3/2005 | Evans et al. | |
| 2005/0081057 A1 | 4/2005 | Cohen et al. | |
| 2005/0108554 A1 | 5/2005 | Rubin et al. | |
| 2005/0132206 A1 | 6/2005 | Palliyil et al. | |
| 2005/0132227 A1 | 6/2005 | Reasor et al. | |
| 2005/0138110 A1* | 6/2005 | Redlich | C07K 14/70575 709/201 |
| 2005/0149720 A1 | 7/2005 | Gruper et al. | |
| 2005/0193070 A1 | 9/2005 | Brown et al. | |
| 2005/0246159 A1 | 11/2005 | Perla et al. | |
| 2005/0278318 A1 | 12/2005 | Vasilik et al. | |
| 2006/0015747 A1 | 1/2006 | Van de Ven | |
| 2006/0037079 A1 | 2/2006 | Midgley | |
| 2006/0044605 A1 | 3/2006 | Schneider et al. | |
| 2006/0095971 A1 | 5/2006 | Costea et al. | |
| 2006/0195451 A1 | 8/2006 | Smith et al. | |
| 2006/0230452 A1 | 10/2006 | Field | |
| 2007/0079379 A1 | 4/2007 | Sprosts et al. | |
| 2007/0083929 A1 | 4/2007 | Sprosts et al. | |
| 2007/0277238 A1 | 11/2007 | Margalit et al. | |
| 2009/0138972 A1 | 5/2009 | Scales | |
| 2009/0178144 A1 | 7/2009 | Redlich et al. | |
| 2009/0210936 A1 | 8/2009 | Omar et al. | |
| 2009/0254572 A1* | 10/2009 | Redlich | G06Q 10/06 |
| 2009/0254992 A1 | 10/2009 | Schultz et al. | |
| 2009/0296657 A1 | 12/2009 | Omar et al. | |
| 2010/0054278 A1 | 3/2010 | Stolfo et al. | |
| 2010/0153507 A1 | 6/2010 | Wei et al. | |
| 2010/0154063 A1* | 6/2010 | Hutton | G06F 21/562 726/24 |
| 2011/0213783 A1 | 9/2011 | Keith, Jr. | |
| 2013/0006701 A1* | 1/2013 | Guven | G06Q 10/0635 705/7.28 |
| 2015/0215332 A1* | 7/2015 | Curcic | H04L 63/1433 726/25 |

FOREIGN PATENT DOCUMENTS

| | | |
|---|---|---|
| EP | 1022639 A2 | 7/2000 |
| EP | 1122932 A2 | 8/2001 |
| EP | 1180880 A1 | 2/2002 |
| EP | 1560112 A1 | 8/2005 |
| EP | 1657662 A2 | 5/2006 |
| GB | 2357939 A | 7/2001 |
| GB | 2427048 A | 12/2006 |
| GB | 2444514 A | 6/2008 |
| JP | 11224190 | 8/1999 |
| JP | 2000222202 | 8/2000 |
| JP | 2002259187 | 9/2002 |
| JP | 2006127497 | 5/2006 |
| WO | 0126004 A2 | 4/2001 |
| WO | 03/017141 A1 | 2/2003 |
| WO | 2004/107684 A1 | 12/2004 |
| WO | 2005/008457 A1 | 1/2005 |
| WO | 2006/047163 A2 | 5/2006 |

OTHER PUBLICATIONS

Apr. 16, 2012 European official action in connection with European patent application No. 06744158.4.

Canadian official action dated Feb. 21, 2013 in corresponding Canadian application No. 2,611,227.

"Checking of Incoming Files for Macro Viruses," Online 2004, retrieved from the Internet: http://www.bsi.de/english/gshb/manuals/s04044.html.

English translation of Mar. 21, 2012 Japanese official action in connection with a counterpart JP application.

Feb. 15, 2011 official action in connection with European patent application No. 06744158.4.

Great Britain search report in connection with Great Britain patent application No. GB624224.2.

"MailStreet Features and Benefits," Apr. 22, 2004, retrieved from the Internet: http://web.archive.org/web/2004042104456/http://www.mailstreet.com/defender/features.asp.

Oct. 21, 2005 search report in connection with counterpart British patent application No. GB0511749.4.

Oct. 4, 2006 international search report in connection with counterpart application No. PCT/GB2006/002107.

Saito, Tado, et al. (1993) "Protection Against Trojan Horses by Source Code Analysis," Electronics and Communication in Japan—Fundamental Electronic Science, Part 3, vol. 77, No. 1, pp. 11-18.

Salamone, Salvatore (1992), "A Magic Bullet for Netware Viruses. Untouchable Network NLM Can Detect and Eliminate Known and Unknown Viruses from Netware Servers," Data Communications, vol. 21, pp. 45-46.

Sep. 21, 2011 Japanese official action in connection with counterpart Japanese patent application No. 2008-515291.

Glasswall Solutions Ltd., 2012 "How it Works," glasswallsolutions.com, available from http://web.archive/org/web/20121015004110/http://www.glasswallsolutions.com/how-it-works, dated Oct. 15, 2012, 1 page.

Glasswall Solutions Ltd., 2013 "What it Does," glasswallsolutions.com, available from http://web.archive/org/web/20130116065146/http://www.glasswallsolutions.com/what-it-does, dated Jan. 16, 2013, 1 page.

Glasswall Solutions Ltd., 2013 "Where it fits," glasswallsolutions.com, available from http://web.archive/org/web/20130116065202/http://www.glasswallsolutions.com/where-it-fits, dated Jan. 16, 2013, 1 page.

International Search Report and Written Opinion, PCT/GB2014/052967, Feb. 3, 2015, 14 pages.

UK Search Report and Examination Opinion for Application No. GB1317607.8, dated Feb. 21, 2014, 8 pages.

* cited by examiner

335

| Database | | |
|---|---|---|
| Category | Issue | Weight |
| Category_1 *405* | | Weight_1 *440* |
| Category_1 *405* | Issue_1 *415* | Weight_2 *445* |
| Category_1 *405* | Issue_2 *420* | Weight_3 *450* |
| Category_1 *405* | Issue_3 *425* | Weight_4 *455* |
| Category_2 *410* | | Weight_5 *460* |
| Category_2 *410* | Issue_1 *430* | Weight_6 *465* |
| Category_2 *410* | Issue_2 *435* | Weight_7 *470* |
| ⋮ | ⋮ | ⋮ |

FIG. 4

STATISTICAL ANALYTIC METHOD FOR THE DETERMINATION OF THE RISK POSED BY FILE BASED CONTENT

FIELD OF THE INVENTION

This invention relates to computer file-based security in general and more specifically to the potential risk contained within commonly communicated file formats.

BACKGROUND

Malware (such as viruses, Trojan horses, and other malicious content) are becoming more and more prevalent. The traditional approaches of constructing signatures to identify these threats is becoming more and more difficult given the rate at which new variants of malware are emerging. The challenge associated with using the signature-based methods is that the problem of "looking for bad" is an unbounded one. The approach is always behind the latest, and most dangerous, threats. An additional issue is that these approaches often create a lot of "noise" in the form of false positive identification of benign content without providing any actionable insight into the potential issue to allow an individual tasked with securing the organization to be able to make an informed decision.

One way to help minimize the number of false positive identification of benign content is by using an electronic sandbox, as shown in FIG. 1. When electronic file 105 is received by the system, for example over network 110, the file can be placed in electronic sandbox 115. Electronic sandbox 115, as its name suggests, is an appliance that can open electronic file 105 in total isolation. Electronic sandbox 115 can be a computer system that is physically isolated (or isolated as completely as possible) from any intranet, so as to prevent the migration of any malicious code. Alternatively, electronic sandbox 115 can be a virtual environment in a computer system, ideally isolated from any other environments on the same computer system (or other networked computer systems).

Once electronic file 105 is opened in electronic sandbox 115, key criteria of the operating system of electronic sandbox 115 can be monitored to look for any suspicious behaviour that might suggest the file is infected with a malicious code. Such behaviour could include, but is not limited to, trying to access the internet, changing registry settings, or attempting to elevate the user privileges.

By using electronic sandbox 115, the dangerous effects of any malicious code in electronic file 105 are strictly confined to the sandbox environment, which is typically discarded for a fresh instance of the environment when the next file is processed. If opening electronic file 105 in electronic sandbox 115 does not demonstrate the presence of any malicious code, then electronic file 105 is likely not a threat, and can be delivered to user 120. On the other hand, if the opening of electronic file 105 in electronic sandbox 115 demonstrates the presence of malicious code, then electronic file 105 can be placed in quarantine 125 until either electronic file 105 can be cleansed somehow of the malicious code, or electronic file 105 is deleted.

The problem with using electronic sandbox 115 in this manner is that it requires considerable overhead to maintain electronic sandbox 115 and to monitor electronic sandbox to determine if electronic file 105 contains malicious code. In addition, monitoring electronic file 105 within electronic sandbox 115 adds considerable latency to the delivery of electronic file 105 to the user. Finally, attackers are aware of the use of electronic sandbox 115. By delaying the activation time of their malicious code until after the inspection time of electronic sandbox 115, the observation of electronic sandbox 115 might fail to detect the malicious code. As a result, electronic file 105 might be delivered to user 120 as safe, even though it contains malicious code.

Embodiments of the invention address this and other problems with the prior art.

BRIEF DESCRIPTION OF THE DRAWINGS

FIG. 4 shows details of the database of FIG. 3.

DETAILED DESCRIPTION

Figure 1:
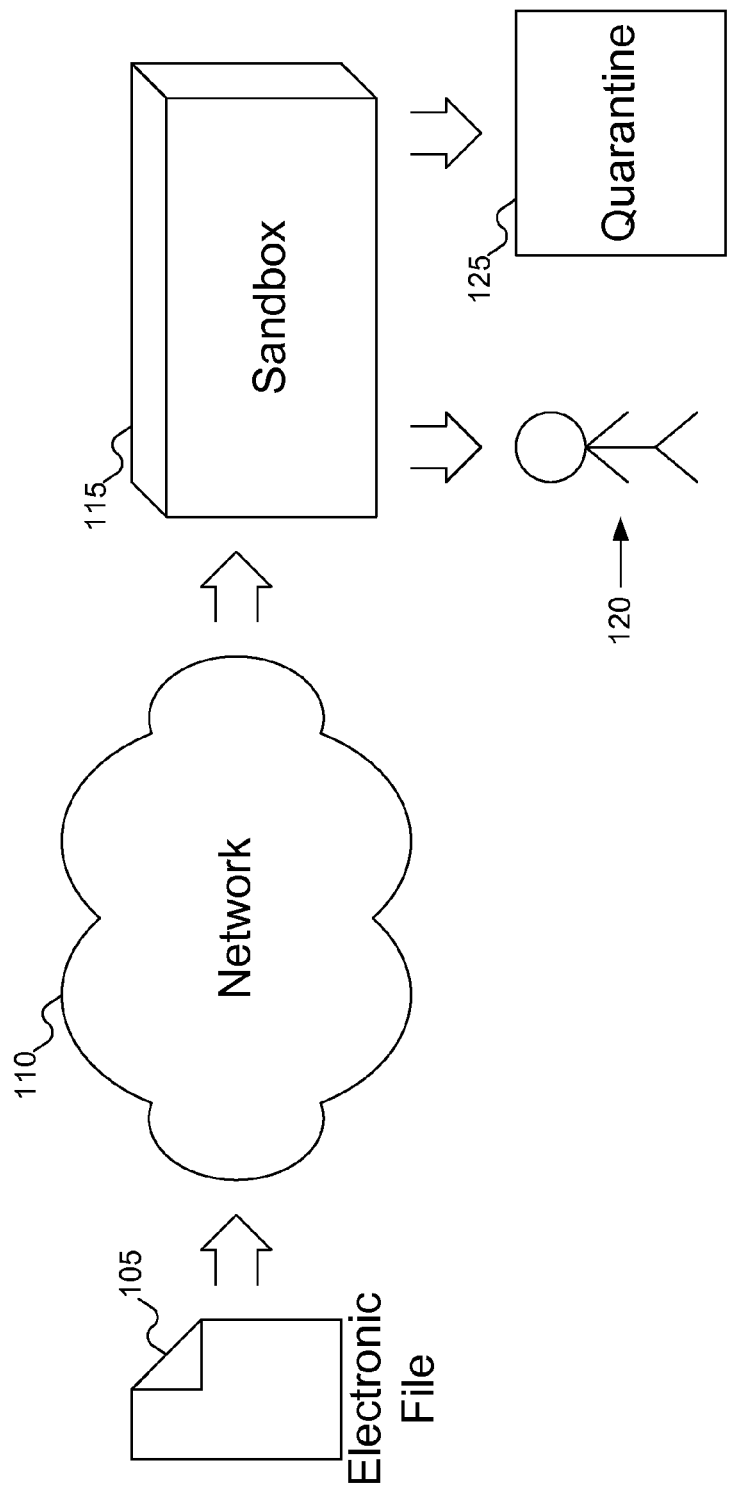
FIG. 1 shows an example of protection against malicious content in the prior art.

Because the illustrated embodiments of the present invention may for the most part be implemented using electronic components and circuits known to those skilled in the art, details will not be explained in any greater extent than that considered necessary as illustrated above, for the understanding and appreciation of the underlying concepts of embodiments of the present invention and in order not to obfuscate or distract from the teachings of embodiments of the present invention.

Other patents and patent applications commonly assigned with this one, including U.S. Pat. Nos. 8,185,954, 8,533,824, 8,869,283 and U.S. Patent Publication No. 2013/0326624, all of which are incorporated by reference herein, describe systems and methods for determining whether the content of electronic files is known to be safe. In brief, these patents and patent applications describe systems and methods that take an electronic file and determine the format the electronic file purports to use (for example, Adobe® PDF® or Microsoft® Word). (Adobe and Adobe PDF are either registered trademarks or trademarks of Adobe Systems Incorporated in the United States and/or other countries. Microsoft is either a registered trademark or trademark of Microsoft Corporation in the United States and/or other countries.) Once the purported format is determined, the content of the electronic file is examined to see if the content conforms to the pre-determined format. If the content conforms to the pre-determined format, then the content is permitted to pass through for delivery to the user. Otherwise, the content is quarantined. The content, whether conforming or not, can also be re-generated. Re-generation of content can further help to prevent malicious content from slipping through, by recreating the content in the pre-determined format. The re-generated electronic file ideally is structurally identical to the original file, but absent any metadata that is not required.

Embodiments of the present invention provides an anti-malware content data management apparatus, which provides malware protection as well as insight into the threat posed by an electronic file by approaching the problem from an alternate viewpoint. The viewpoint of definable good is a bounded problem in the sense that what is known to be good for a particular file format does not change compared to trying to keep pace with the ever changing definition of known bad. It is possible to determine the goodness of files that are defined as passive: i.e., files that do not contain active of program code within them. These files are the typical files that organisations communicate on a daily basis. But these files are also the files in which new waves of attacks tend to hide within.

By adding a further dimension of understanding, enabled by the understanding of the file content, embodiments of the present invention produces a score related to the type of content that the file in question contains, as well as the perceived risk based on historical statistics skewed with a configurable weighting factor. This approach deviates from the traditional and known art, which only provides a safe/unsafe binary answer as to the files credibility. Embodiments of the present invention extends this by providing shades of grey, to allow individuals and indeed further decision making processes to blend this information into the overall decision making process for that particular file or content thus increasing the accuracy of malware detection, as well as reducing the false positive rate.

By extending the mantra of "looking for good" process, which maintains a rule list of many thousands of rules that enforce the currently understood criteria and by categorising these into a subset of said rules, a collection of content groups can be realised that can then be weighted and summed to form a consistent score across a large corpus of files analysed. The result of this score can then inform with more colour than a simple good/bad decision can.

The systems and methods described herein add a secondary layer of analytical processing over and above the approach of evaluating a file based on its conformity to known good content, which provides a binary outcome in the sense that the file is either conforming or non-conforming. This additional layer on top of this binary process allows a third outcome to an implementation whereby the original, un-sanitised version of the document is allowed to be delivered to a recipient if it is deemed a low risk.

Examples of systems that can incorporate embodiments of the claimed invention can include the realisation of an e-mail protection system whereby decisions around whether a file, typically an attachment, should be quarantined or not can be enhanced by the analytical scoring capability. In certain circumstances, specifically in a Small/Medium Enterprise (SME) environment, there is often no security expertise on-site to make the judgment call as to whether to release or permanently quarantine the file. The SME environment is typically serviced by Managed Service Security Providers (MSSP), who offer a remote managed service offering, thus allowing the organisation to "out-source" its security capability to the MSSP. Therefore, any "false-positive" incidents at this level result in a costly support telephone call back to the MSSP to release the file or provide further explanation of the issue. By utilising embodiments of the claimed invention, an automated process can be released whereby quarantined files can be subject to much more coloured decision making and managed in a much more streamlined and cost effective manner.

Another example is where the MSSP provider can remotely adjust the weightings applied to the categories to increase or decrease the importance of an associated content group on the decision making process depending on the current threat landscape and the importance of this content in the mitigation of any new and current attacks.

Examples also include the implementation of an optimised sandbox process, which typifies the process whereby suspicious files received by an organisation across a number of potential ingress point are opened, or commonly referred to as "detonated" within a controlled environment whereby any potential malware contained within said file is unable to cause any damage or spread to other environments. The current state of the art sandbox process typically observes the file for around five minutes to ascertain whether it is likely the file will perform any malicious act before then either quarantining the file or allowing it to pass on to its intended recipient. The issue with this approach that every file is processed and subject to a delay of this nature, causing significant processing overhead and bandwidth usage. Embodiments of the invention, on the other hand, optimise this process because electronic files can be scored based on the content groups contained within and by setting a threshold before the file is placed in the sandbox. If the score for the electronic file is sufficient, the sandbox can be bypassed, alleviating the necessity on every file being "detonated" by the sandbox. The sandbox infrastructure can then focus its full resources on only the files that need to be scanned as they have scored above (or below, depending on the implementation) the threshold, suggesting that there is a reason for further investigation.

Figure 2:
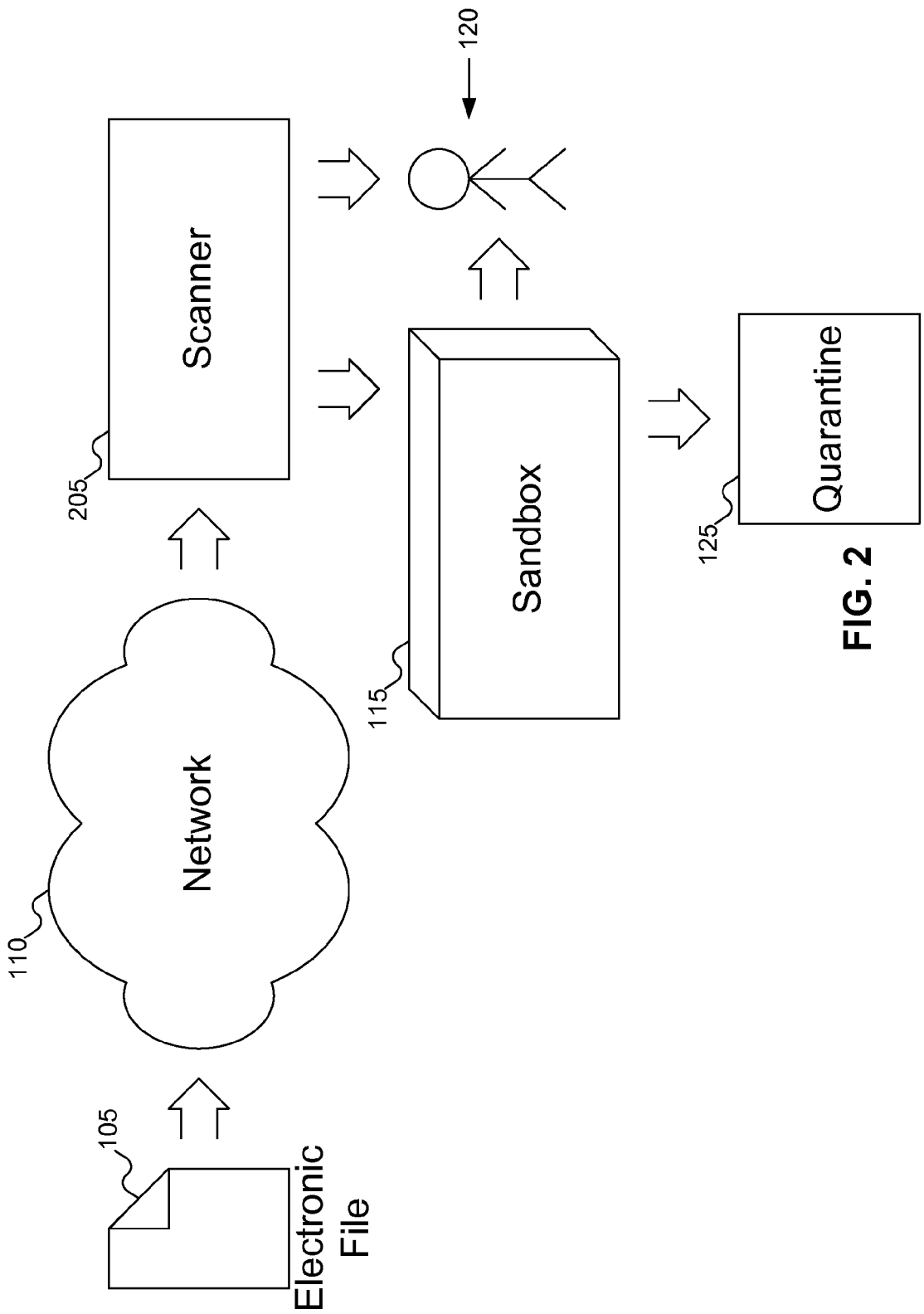
FIG. 2 shows the electronic sandbox of FIG. 1, augmented by a system designed to calculate a risk assessment for an electronic file, according to an embodiment of the invention.

FIG. 2 highlights how embodiments of the invention addresses these drawbacks in sandbox implementations. Electronic file 105 can be submitted to an embodiment of the invention, as represented by scanner 205, which can be inline before sandbox 115. The process of statistical scoring can be applied to electronic file 105 to ascertain whether electronic file 105 can be regenerated or not. If electronic file 105 can be regenerated because it is conformant as specified by the rules relating to the format of electronic file 105, then the regenerated file can bypass sandbox 115 and be delivered to user 120 through whichever vector is appropriate. If electronic file 105 cannot be regenerated because electronic file 105 does not comply with the rules set down by the file format specification, then electronic file 105 can be forwarded to sandbox 115. Embodiments of the invention therefore have the effect of acting as a noise filter and only requiring sandbox 115 to be instantiated on a limited number of files that have issues that have non-conformancy problems or those that have an associated policy violation. It should be obvious to those skilled in the art that this optimising filter has considerable benefit to the overall process in terms of both performance and overhead.

Although file conformancy policies can be drafted directly in scanner 205, network connection 110 can also be used to remotely administer file conformancy policies. These policies determine the type of non-conformances within a file that will cause scanner 205 to deem the file as non-conforming and therefore forward the file to sandbox 115. By changing the policies used by scanner 205, load balancing can be realised, whereby during times of peak demand or indeed peak malware activity the bias between delivering an electronic file directly to user 120 or detonating electronic file 105 in sandbox 115 can be varied. These polices can be determined based on organisational preference of state and mediated by current malware activity.

Figure 3:
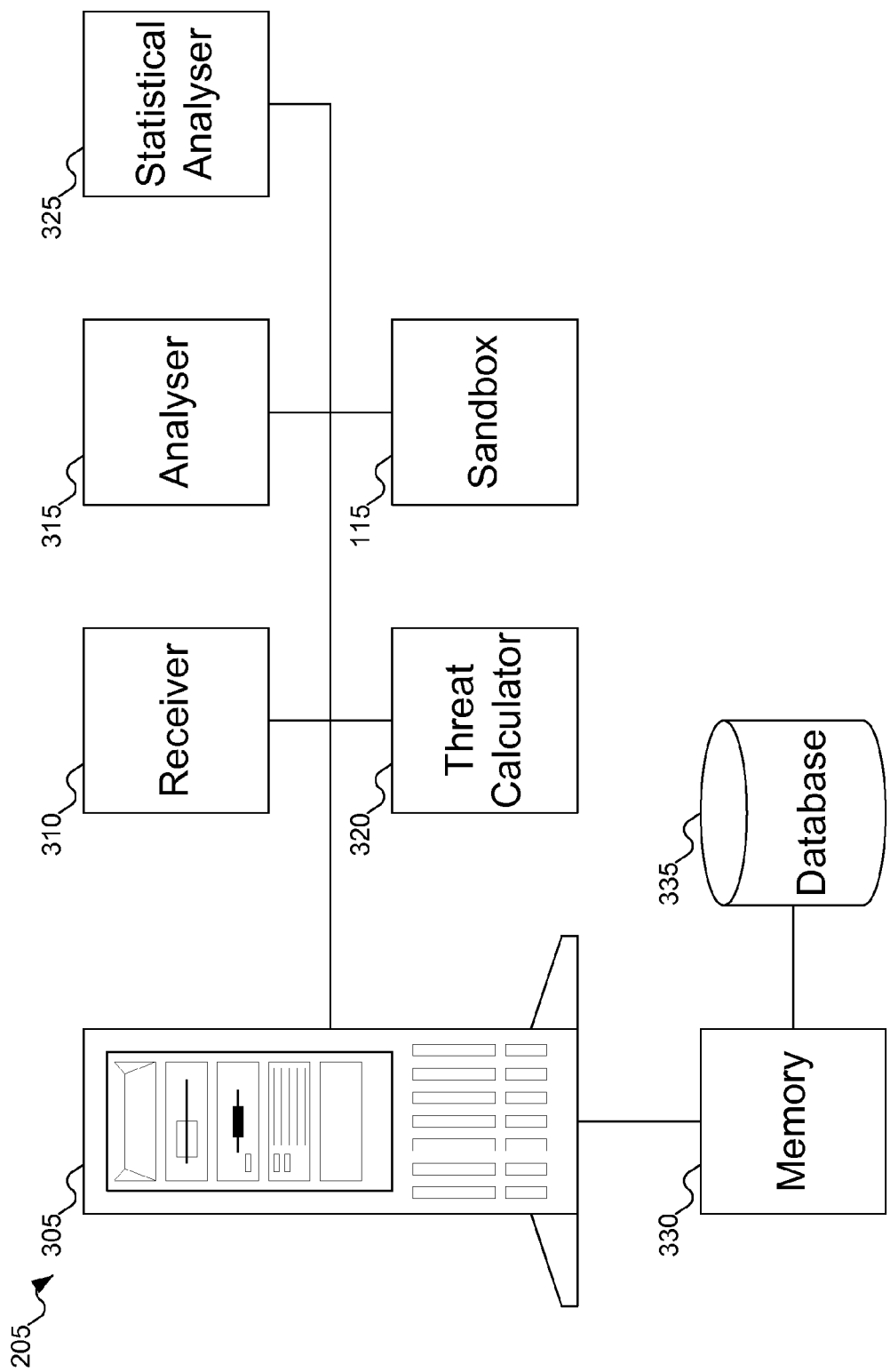
FIG. 3 shows more detail about the scanner of FIG. 2, according to an embodiment of the invention.

FIG. 3 shows more detail about the scanner of FIG. 2, according to an embodiment of the invention. Scanner 205 can include a computer 305, which can be suitably programmed to implement embodiments of the invention. Alternatively, computer 305 can include special-purpose components designed to implement embodiments of the invention.

Computer 305 can include receiver 310, analyser 315, and threat calculator 320. Receiver 310 can receive data, such as the electronic file being examined, or weights used for categories of checks. Analyser 315 can analyse an electronic document to see if the content of the electronic document conforms to the format of the electronic document. As described above, the checks associated with determining whether content is known to be good can be organized into various categories. There can be thousands of checks, organized into various categories. Analyser 315 uses these checks, as organized, to determine whether the electronic file conforms to the format expected for the electronic file. Analyser 315 can produce a report that identifies which checks do not return the expected results, and to which categories those checks belong.

Threat calculator 320 can then take the output of analyser 315 and calculate a threat score for the electronic document. For each issue identified by analyser 315, threat calculator can identify the corresponding weight and calculate the overall threat score by summing the products of the number of times an issue was found and the weights associated with that issue. This sum can then be compared with a threshold to determine whether the electronic file is considered to be at risk or not.

If the electronic file is considered to be at risk, then the electronic document can be detonated in sandbox 115 as before. FIG. 3 shows sandbox 115 as part of scanner 205: a person skilled in the art will recognize that sandbox 115 can be implemented as software, in which case any suitable computer can implement the software for sandbox 115. In that case, sandbox 115 can be part of computer 305. But sandbox 115 can be separate from scanner 205, as shown in FIG. 2: sandbox 115 can be implemented as part of a separate computer, or as a special-purpose machine, either of which can be sufficiently isolated to prevent any malicious code in the electronic file from achieving its intended purpose.

Computer 305 can also include statistical analyser 325. As described below with reference to FIG. 6, analyser 315 can be used in analysis mode, operating on sets of known files. Statistical analyser 325 can then process the results of these analyses to establish initial weights for use in determining whether an electronic file is considered to be a threat.

Computer 305 can also include memory 330. Memory 330 can be used to store information: for example, a copy of the electronic file being scanned by the system. Memory 330 can also store database 335, which can include information about the checks used to verify that the electronic file conforms to its purported file format. FIG. 4 shows more detail about database 335.

In FIG. 4, database 335 is shown as including data in three columns. (While the term "column" suggests a tabular format for database 335, a person skilled in the art will recognize that database 335 can store data in any desired structure, and is not limited to tabular format.) The three columns store categories, issues, and weights. For example, database 335 shows two different categories 405 and 410, five issues 415, 420, 425, 430, and 435 (divided between the two categories), and seven weights 440, 445, 450, 455, 460, 465, and 470. For individual categories or issues, weights can be assigned. For example, category 1 405 has weight 1 440, whereas issue 1 415 (associated with category 1 405) has weight 2 445.

FIG. 4 actually shows different possible embodiments. In some embodiments of the invention, the categories are assigned weights, rather than the individual issues. In other embodiments of the invention, individual issues are assigned weights. Where the weights are assigned to categories, the number of issues in that category can be multiplied by the weight for the category. Where the weights are assigned to issues, the number of occurrences of each issue can be multiplied by the weight for that issue. Regardless of whether weights are per category or per issue, the sum of the products can then be computed, which represents the score for the electronic file.

Although one might think that all weights have the same sign (i.e., all are positive or negative, depending on the way the pre-determined threshold is used), no such limitation actually exists. Parties that create malicious content typically want their malicious content to achieve its objective: be it damage a computer system, extract and transmit data back to the malicious content creator, or convert computers into zombies (computers that are controlled by people other than the normally expected users), among other possibilities. The more suspicious a file looks, the less likely it is that any malicious content will achieve its objective. Thus, it is reasonable to expect that a file that has malicious content has relatively few other issues associated with it. For this reason, some issues that are not typically associated with malicious content can be assigned weights of opposite sign, thereby reducing the likelihood that the electronic file is considered a risk. For example, positive weights can be assigned to less significant issues and negative weights can be assigned to more significant issues, and a threat score that is less than the pre-determined threshold can indicate an electronic file is considered a threat. The use of weights of mixed signs can also impact the pre-determined threshold to use. For example, in one embodiment of the invention, the pre-determined threshold can be zero.

Figure 5:
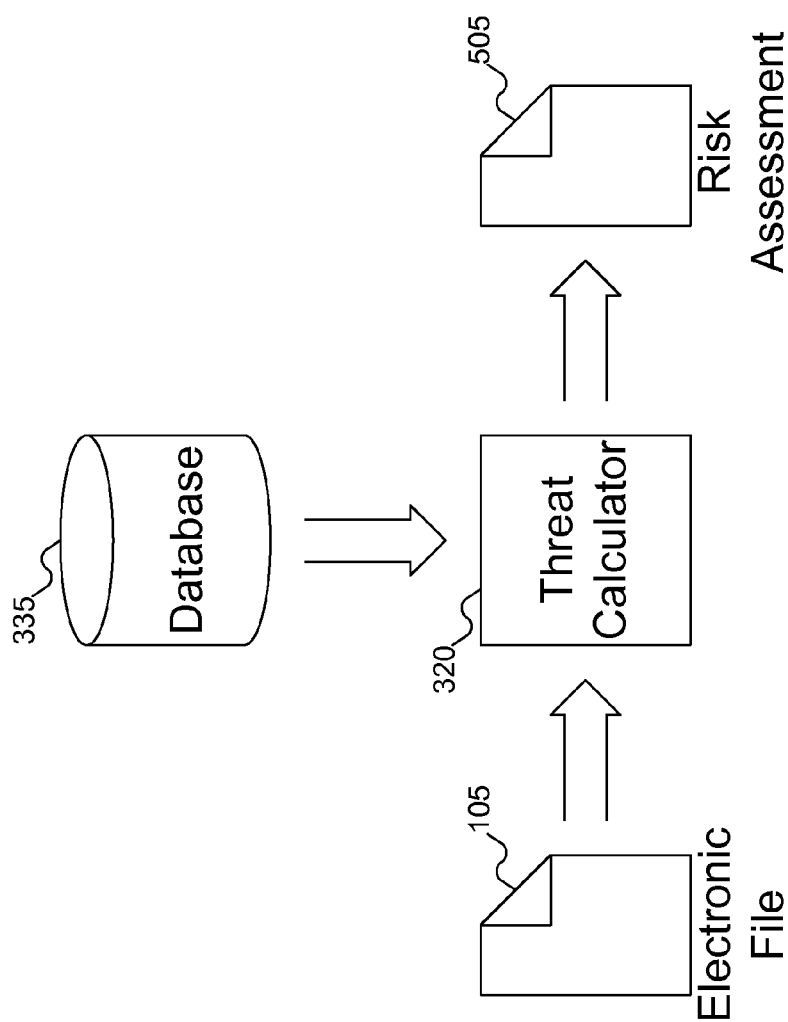
FIG. 5 shows details of the threat calculator of FIG. 3.

FIG. 5 shows details of the threat calculator of FIG. 3. As discussed above, a threat score can be calculated for an electronic file. Embodiments of the invention can check to see whether an electronic file conforms to its purported file format. For a given purported file format, checks can be performed to see if the electronic file meets the standard for that file format. If a particular check is not satisfied—that is, the electronic file fails to satisfy some element of the standard for that file format—then that issue is flagged as having occurred. Threat calculator 320 can take electronic file 105 and database 305, and calculate risk assessment 505 (also called threat score, or simply score) for electronic file 105. In one embodiment of the invention, risk assessment 505 is calculated by multiplying the number of occurrences of each issue by the corresponding weight for that issue, and summing the products.

Note that in some embodiments of the invention, weights are assigned to categories rather than to individual issues. In these embodiments of the invention, the system can calculate the number of occurrences of issues in each category based on the individual checks. This number can then be multiplied by the weight assigned to the category for use in the calculation of risk assessment 505 similar to the discussion above.

One point that has not been discussed in detail is how the weights used in database are 335 assigned. Obviously, a user could manually assign the weights, or default weights established by the supplier of the system can be used. But it is also possible to automate the calculation of the initial weights. In embodiments of the invention, analyser 315 can run not only in a scanning mode but also in an analysis mode. In analysis mode, analyser 315 can take files that are known, analyse those files, and generate weights from the analysis.

Figure 6:
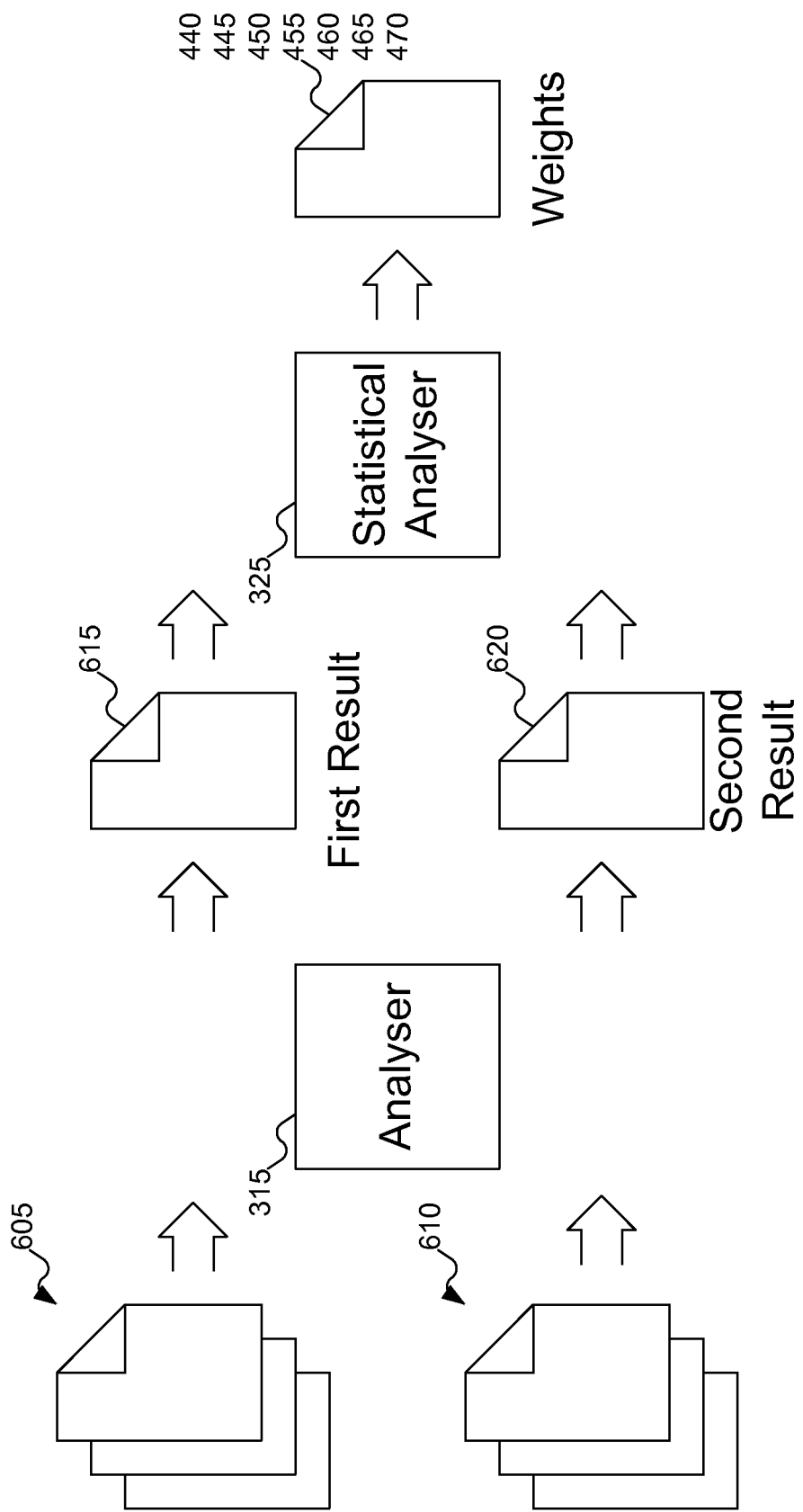
FIG. 6 shows details of the analyser and statistical analyser of FIG. 3 when used in analysis mode.

FIG. 6 shows details of the analyser and statistical analyser of FIG. 3 when used in analysis mode. In FIG. 6, analyser 315 can receive two corpuses of files, such as corpus 605 and 610. Analyser 315 can then analyse corpuses 605 and 610, and produce results 615 and 620. For example, corpus 605 can include files that are known to include malicious content, whereas corpus 610 can include files that are known to have issues but are otherwise not a threat. Statistical analyser 325 can then process these results 615 and 620 to adjust the weights assigned to the categories or checks/issues when analysing electronic documents in normal operating mode. Statistical analyser 325 can use any desired algorithm to adjust weights. In some embodiments of the invention, the weights are adjusted until the threat scores for files in corpus 605 indicate a greater risk than the threat scores for files in corpus 610.

Even after initial weights have been determined, users might choose to adjust the weights. For example, one user of such a system might decide that macros included in a document are considered safe, even though macros can be used to achieve malicious results. Another user of such a system might decide that a misnamed font indicates a significant risk, even though the name of the font generally cannot be used to malicious impact. Thus, the default weights can be overwritten by users (or alternatively, at the user's direction, but by the manufacturer of the system).

The above description of FIG. 6 might suggest that the use of analyser 315 in analysis mode can only occur to determine the initial weights used by the system. And in some embodiments of the invention, analyser 315 is used in analysis mode only before the system is put into operation to protect a customer. But there is no reason that the results of analysing an electronic file by analyser 315, even during use of the system to protect a customer, cannot be used to adjust the weights. For example, when electronic files are analysed by analyser 315, the system (either directly or using statistical analyser 325) can use these analyses as feedback to adjust the weights assigned to the categories or checks/issues. This feedback can occur in any desired manner. For example, the feedback can be applied for each electronic file analysed by analyser 315, regardless of the results of the analysis. Or, the feedback can be applied only when a file is considered to be a risk, or when a file is considered to be safe. A person of ordinary skill in the art will recognize other ways in which feedback can be managed.

The above description implies that every weight in the database is adjusted. While this implication can be true, it is not required. It can occur that only some of the weights are adjusted: perhaps only one weight is adjusted. It can also occur that the result of statistical analyser 325 determines that the initial weights are satisfactory and require no adjustment. Embodiments of the invention are intended to encompass all such variations.

Figure 7:
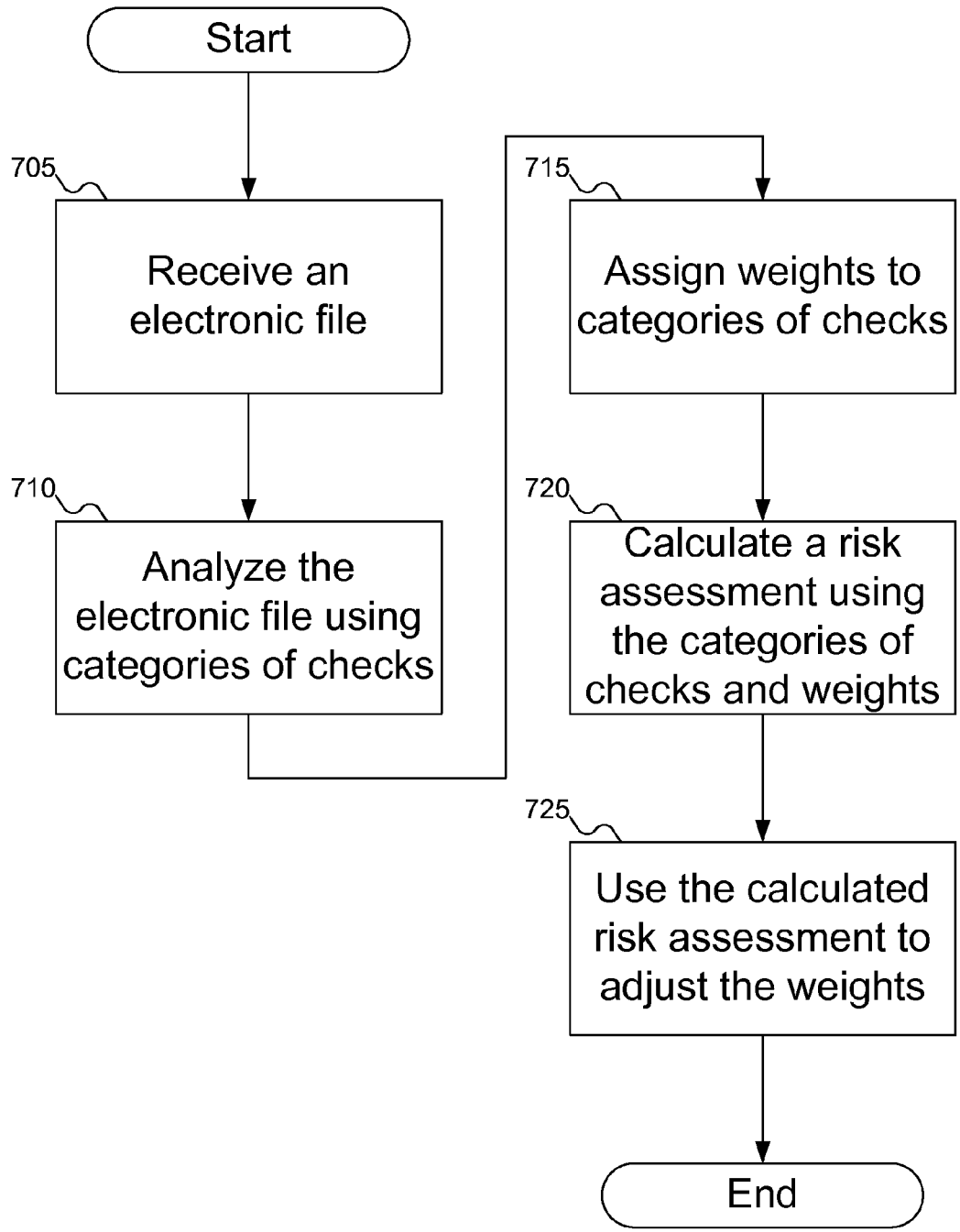
FIG. 7 shows a flowchart of a procedure for calculating a risk assessment for an electronic file in the system of FIG. 3, according to an embodiment of the invention.

FIG. 7 shows a flowchart of a procedure for calculating a risk assessment for an electronic file in the system of FIG. 3, according to an embodiment of the invention. In FIG. 7, at block 705, the system can receive an electronic file. At block 710, the system can analyse the electronic file using various checks organized into categories. At block 715, the system can determine weights for the various categories (or, alternatively as described above, the checks/issues themselves). At block 720, the system can calculate a risk assessment or threat score for the electronic file, using the checks and categories, and the associated weights. Finally, at block 725, the system can use the calculated risk assessment to adjust the weights, for example, in a feedback loop.

Figure 8:
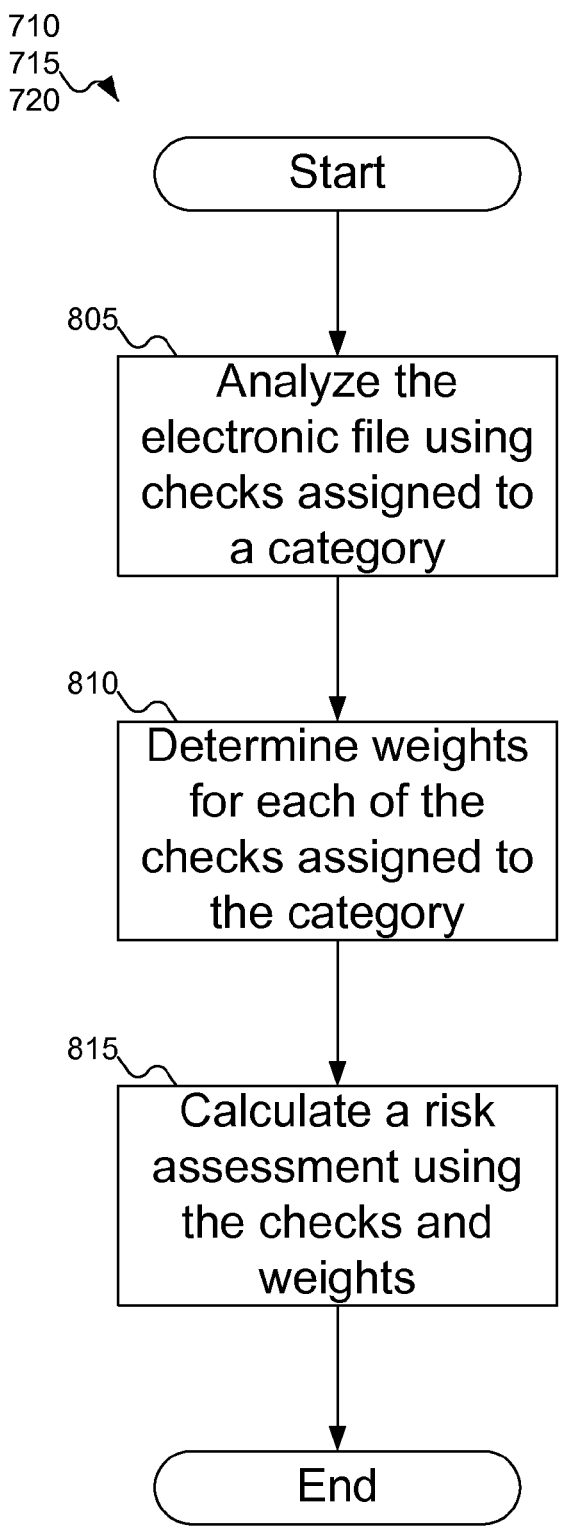
FIG. 8 shows a flowchart of alternatives to the procedure for calculating a risk assessment of FIG. 7, according to a second embodiment of the invention.

FIG. 8 shows a flowchart of alternatives to the procedure for calculating a risk assessment of FIG. 7, according to a second embodiment of the invention. As discussed above, weights can be assigned, not to the categories of checks, but to the checks themselves. Instead of blocks 710, 715, and 720 as shown in FIG. 7, blocks 805, 810, and 815 can be substituted. In block 805, the electronic file can be analysed using individual checks. At block 810, weights for the individual checks can be determined. And at block 815, the system can calculate a risk assessment or threat score based on the checks and the weights assigned to them.

Figure 9A:
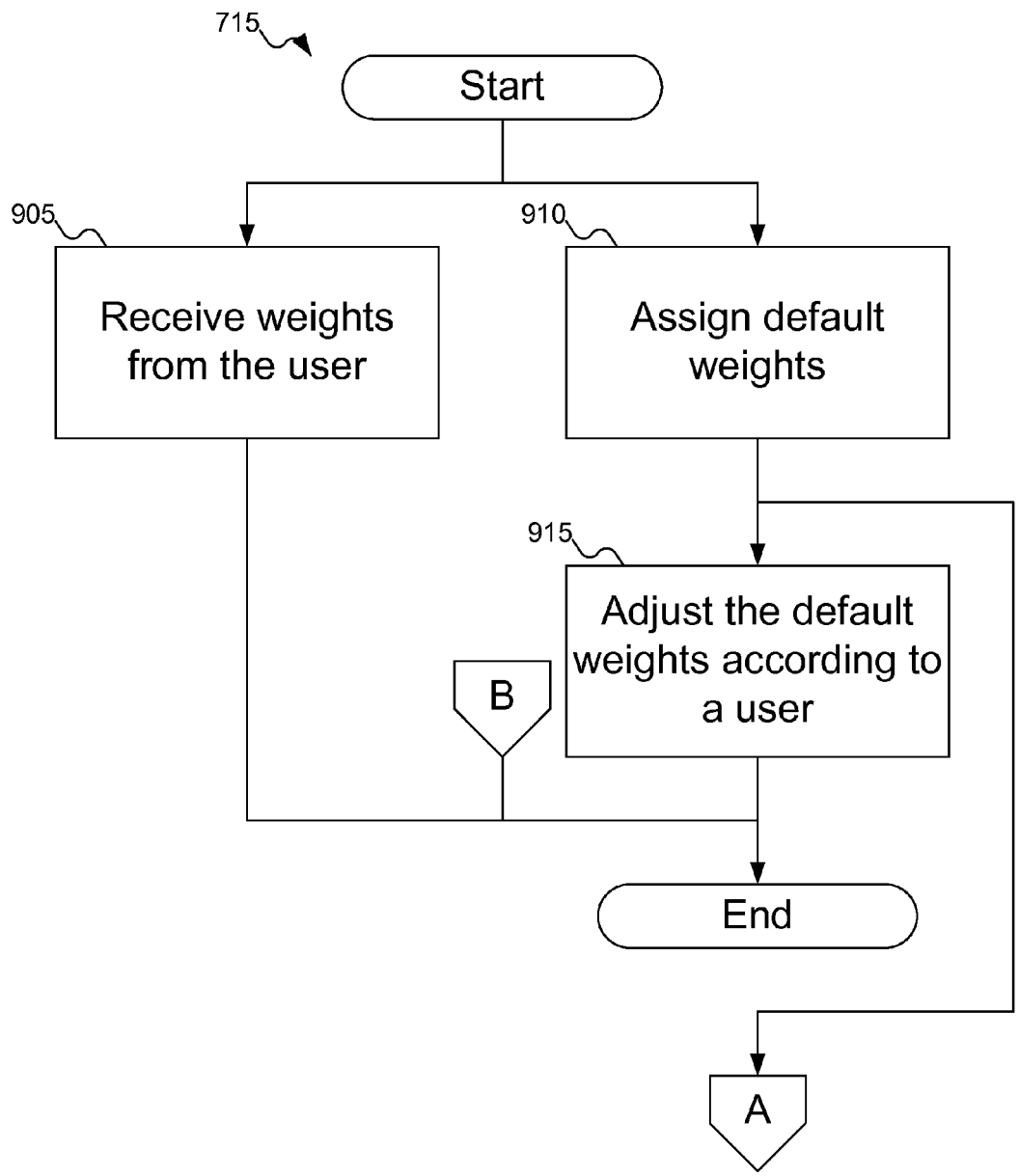
FIGS. 9A-9B show a flowchart of a procedure for calculating weights used in the procedure of FIG. 7.
Figure 9B:
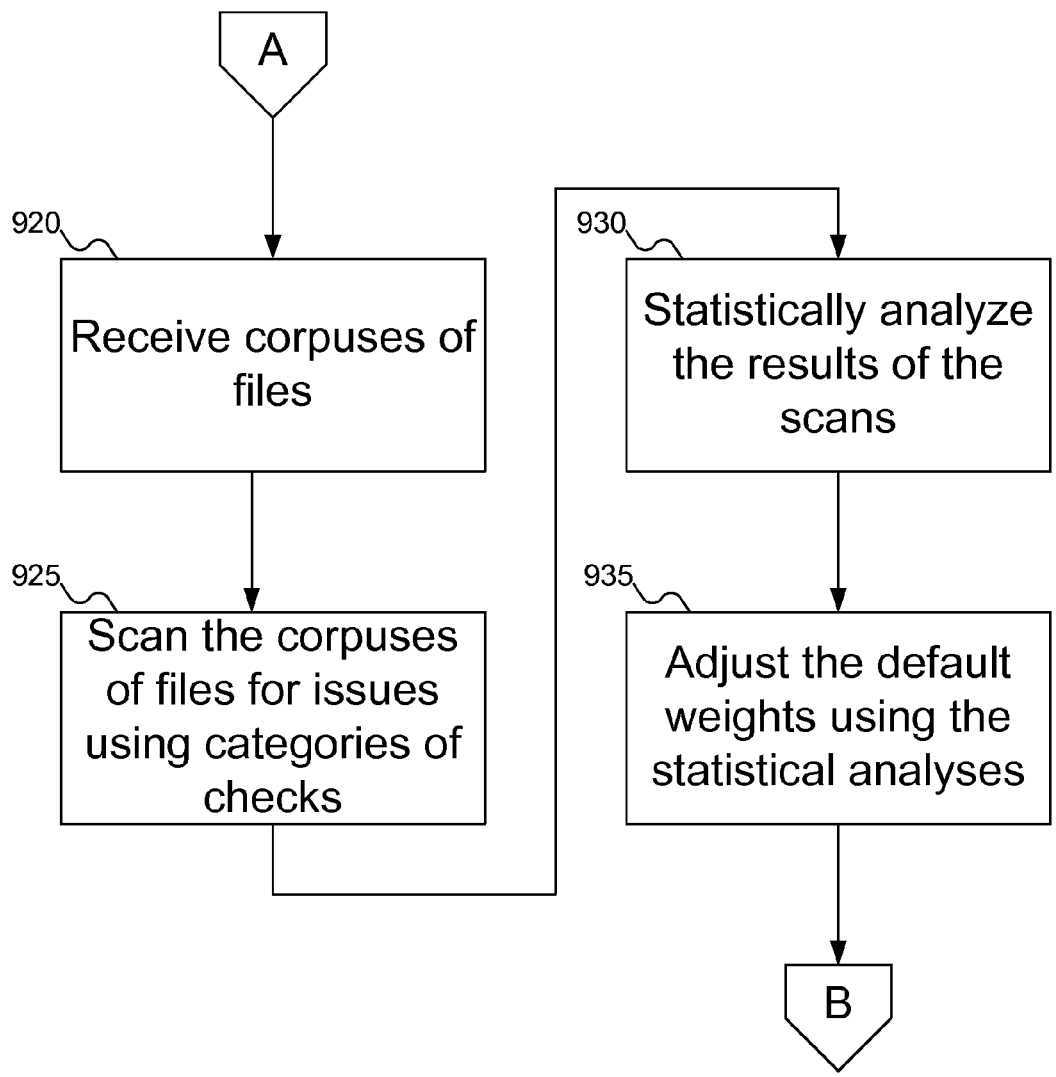

FIGS. 9A-9B show a flowchart of a procedure for calculating weights used in the procedure of FIG. 7. The weights discussed in FIGS. 9A-9B can be either for the categories of checks or for the individual checks. In FIG. 9A, at block 905, weights can be assigned by the user. Alternatively, at block 910, default weights can be assigned. At block 915, the default weights can be adjusted by the user.

In FIG. 9B, to determine the default weights (or as a replacement for default weights provided in some other manner), weights can be calculated by analysing known files. At block 920, the system can receive corpuses of files. As described above, in some embodiments of the invention, one corpus can include files known to contain malicious content, and another corpus can include files with issues that are known not to be a threat. At block 925, the corpuses of files can be scanned using the checks/categories of checks. At block 930, the results of the analysis can be statistically analysed. And at block 935, the default weights can be adjusted using the statistical analysis. Control can then return to FIG. 9A, where processing ends.

Figure 10A:
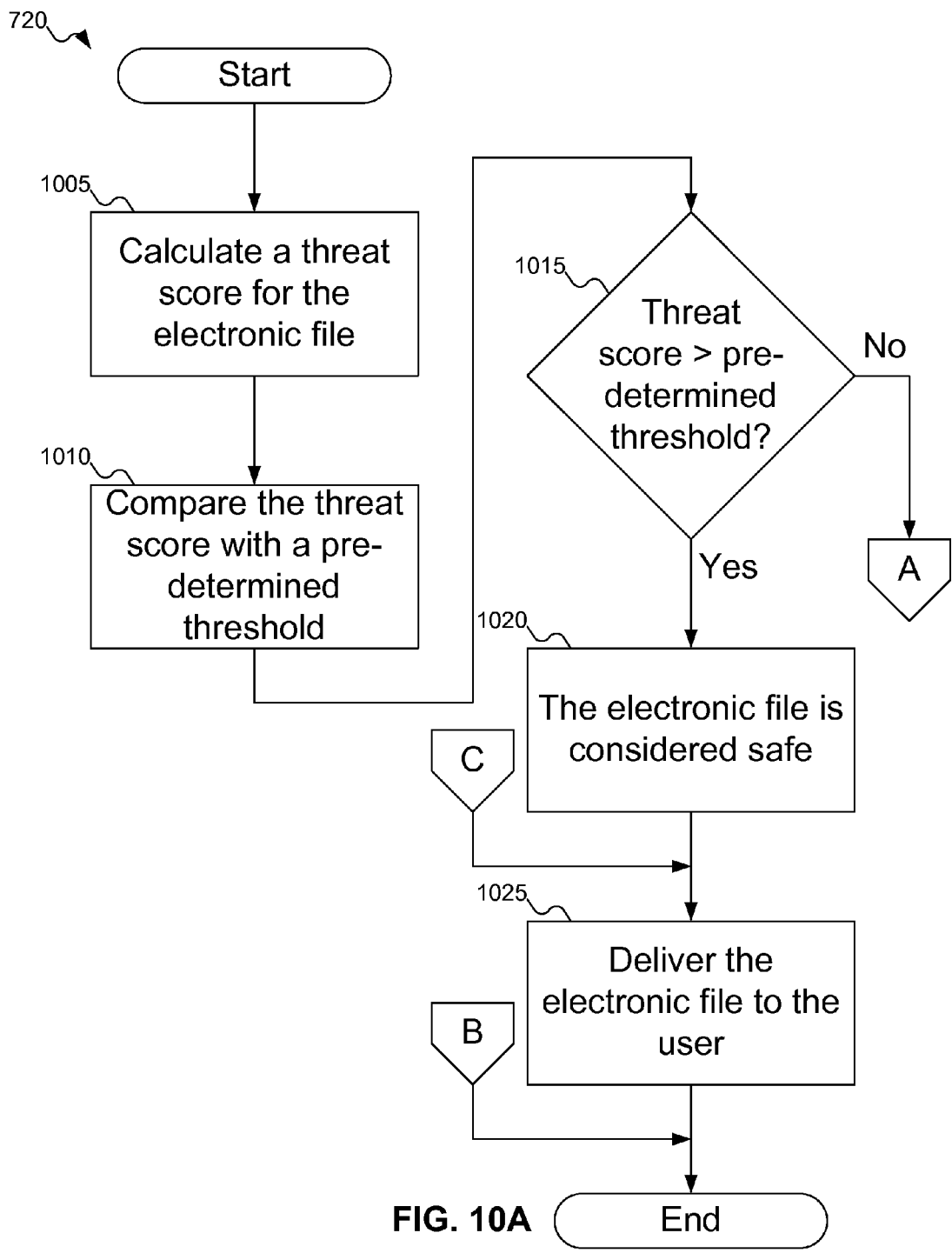
FIGS. 10A-10B show a flowchart of a procedure for determining whether to use an electronic sandbox in the procedure of FIG. 7.
Figure 10B:
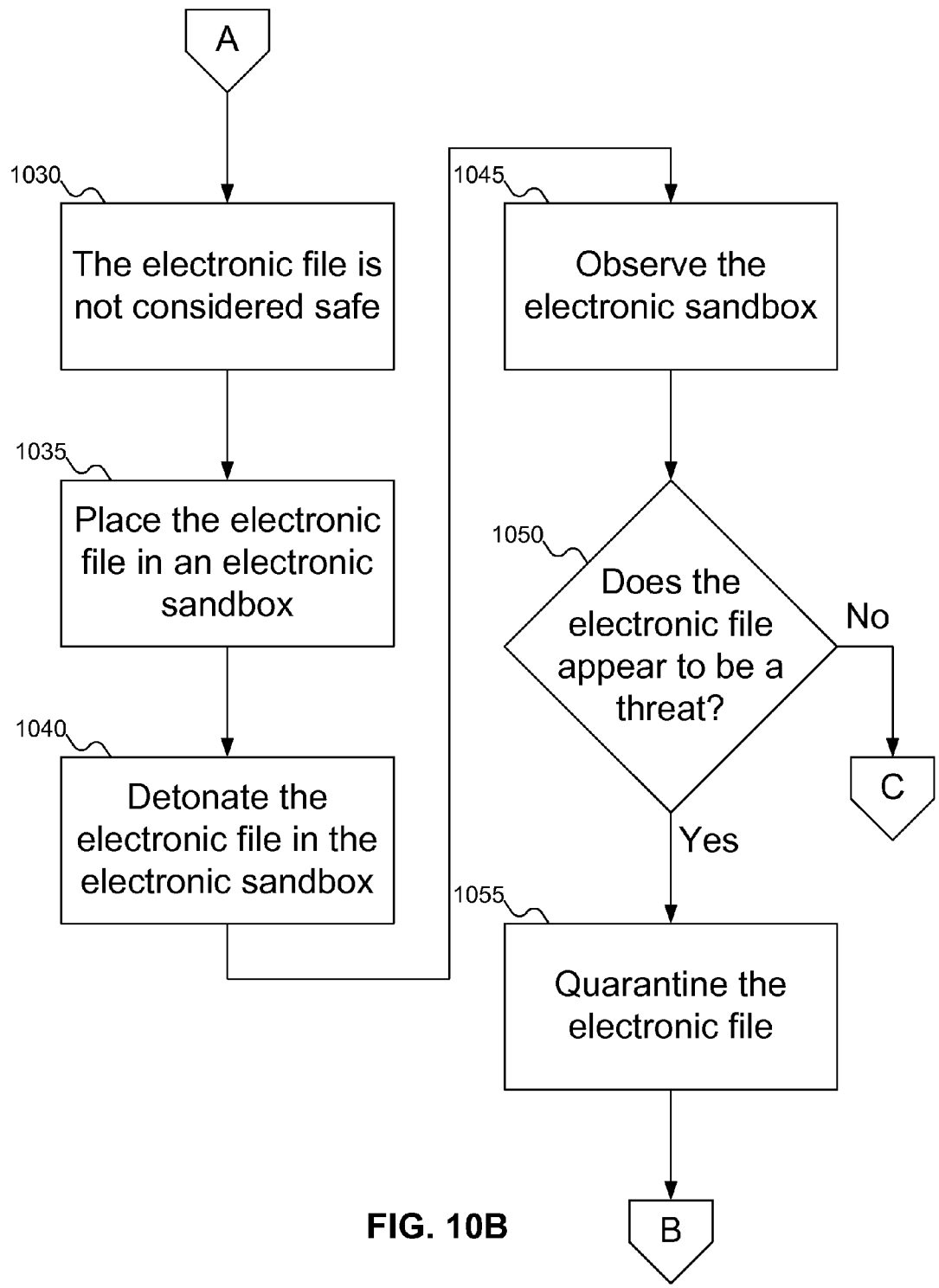

FIGS. 10A-10B show a flowchart of a procedure for determining whether to use an electronic sandbox in the procedure of FIG. 7. In FIG. 10A, at block 1005, the system can calculate a threat score for an electronic file. At block 1010, the system can compare the threat score with a pre-determined threshold. At block 1015, the system determines if the threat score exceeds the pre-determined threshold. If so, then at block 1020 the electronic file is considered safe and at block 1025 the system can deliver the electronic file to the intended recipient.

If the threat score does not exceed the pre-determined threshold, then at block 1030 (FIG. 10B), the system can note that the electronic file is not considered safe. At block 1035, the system can place the electronic file in a sandbox. At block 1040, the system can detonate the electronic file (in any appropriate manner), and at block 1045, the system can observe the operation of the sandbox. At block 1050, the system determines if the electronic file appears to be a threat. If so, then at block 1055, the system can quarantine the file until appropriate remedies can be applied. Otherwise, processing can return to block 1025 (FIG. 10A) to have the system deliver the electronic file to the intended recipient.

Although FIGS. 10A-10B describe an electronic file as considered safe when the threat score exceeds the pre-determined threshold, a person of ordinary skill in the art will recognize that the test for whether an electronic file is considered safe or not can depend on how the threat score is calculated. Thus, if positive weights are used for issues that are considered more significant, an electronic file can be considered safe if the threat score is less than a pre-determined threshold, and can be considered a risk if the threat score is greater than the pre-determined threshold.

The above flowcharts show some possible embodiments of the invention. But other embodiments of the invention can organize the blocks in different arrangements, and can include or omit different blocks as desired, or repeat a block (or multiple blocks) as needed. Embodiments of the invention are intended to include all such variations on the flowcharts, whether or not explicitly shown or described.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 810.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored on tangible computer-readable media as non-transitory computer-executable instructions. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "in one embodiment" or the like are used herein, these phrases are meant to generally reference embodiment possibilities, and are not intended to limit the invention to particular embodiment configurations. As used herein, these terms may reference the same or different embodiments that are combinable into other embodiments.

Embodiments of the invention can extend to the following statements, without limitation:

An embodiment of the invention includes a system, comprising a computer; a memory in the computer; a database stored in the memory, the database including: a plurality of checks organized into a plurality of categories, and for each of the plurality of categories, a weight assigned to the category; a receiver to receive an electronic file; an analyser to analyse the electronic file using the plurality of checks in the database; and a threat calculator to calculate a risk assessment for the electronic file using a result from the analyser and the weights assigned to the plurality of categories.

An embodiment of the invention includes a system, comprising a computer; a memory in the computer; a database stored in the memory, the database including: a plurality of checks organized into a plurality of categories, for each of the plurality of categories, a weight assigned to the category, and for each of the plurality of checks, a second weight assigned to the check; a receiver to receive an electronic file; an analyser to analyse the electronic file using the plurality of checks in the database; and a threat calculator to calculate a risk assessment for the electronic file using a result from the analyser, the weights assigned to the plurality of categories, and the second weights assigned to the plurality of checks.

An embodiment of the invention includes a system, comprising a computer; a memory in the computer; a database stored in the memory, the database including: a plurality of checks organized into a plurality of categories, and for each of the plurality of categories, a weight assigned to the category; a receiver to receive an electronic file; an analyser to analyse the electronic file using the plurality of checks in the database; and a threat calculator to calculate a risk assessment for the electronic file using a result from the analyser and the weights assigned to the plurality of categories, wherein the receiver is operative to receive the weights assigned to the plurality of categories from a user.

An embodiment of the invention includes a system, comprising a computer; a memory in the computer; a database stored in the memory, the database including: a plurality of checks organized into a plurality of categories, and for each of the plurality of categories, a weight assigned to the category; a receiver to receive an electronic file; an analyser to analyse the electronic file using the plurality of checks in the database; and a threat calculator to calculate a risk assessment for the electronic file using a result from the analyser and the weights assigned to the plurality of categories, wherein the weights assigned to the plurality of categories include default weights assigned to the plurality of categories, and wherein the receiver is operative to receive second weights from a user to assign to the plurality of categories.

An embodiment of the invention includes a system, comprising a computer; a memory in the computer; a database stored in the memory, the database including: a plurality of checks organized into a plurality of categories, and for each of the plurality of categories, a weight assigned to the category; a receiver to receive an electronic file; an analyser to analyse the electronic file using the plurality of checks in the database; and a threat calculator to calculate a risk assessment for the electronic file using a result from the analyser and the weights assigned to the plurality of categories, wherein the weights assigned to the plurality of categories include default weights assigned to the plurality of categories, wherein the analyser is operative to analyse a first corpus of files with known non-conformities to produce a first result and to analyse a second corpus of safe files to produce a second result, and wherein the system further comprises a statistical analyser to statistically review the first result and the second result and to adjust the default weights assigned to the plurality of categories so that a first calculated risk assessment for the first corpus of files is higher than a second calculated risk assessment for the second corpus of files.

An embodiment of the invention includes a system, comprising a computer; a memory in the computer; a database stored in the memory, the database including: a plurality of checks organized into a plurality of categories, and for each of the plurality of categories, a weight assigned to the category; a receiver to receive an electronic file; an analyser to analyse the electronic file using the plurality of checks in the database; a threat calculator to calculate a risk assessment for the electronic file using a result from the analyser and the weights assigned to the plurality of categories, and a statistical analyser to use the result from the analyser adjust the weights.

An embodiment of the invention includes a system, comprising a computer; a memory in the computer; a database stored in the memory, the database including: a plurality of checks organized into a plurality of categories, and for each of the plurality of categories, a weight assigned to the category; a receiver to receive an electronic file; an analyser to analyse the electronic file using the plurality of checks in the database; and a threat calculator to calculate a risk assessment for the electronic file using a result from the analyser and the weights assigned to the plurality of categories, wherein the system is operative to deliver the electronic file to a second user if the calculated risk assessment is greater than a pre-determined threshold.

An embodiment of the invention includes a system, comprising a computer; a memory in the computer; a database stored in the memory, the database including: a plurality of checks organized into a plurality of categories, and for each of the plurality of categories, a weight assigned to the category; a receiver to receive an electronic file; an analyser to analyse the electronic file using the plurality of checks in the database; a threat calculator to calculate a risk assessment for the electronic file using a result from the analyser and the weights assigned to the plurality of categories, and an electronic sandbox, the electronic file placed in the electronic sandbox if the risk assessment for the file does not exceed a pre-determined threshold.

An embodiment of the invention includes a system, comprising a computer; a memory in the computer; a database stored in the memory, the database including: a plurality of checks organized into a plurality of categories, and for each of the plurality of categories, a weight assigned to the category; a receiver to receive an electronic file; an analyser to analyse the electronic file using the plurality of checks in the database; a threat calculator to calculate a risk assessment for the electronic file using a result from the analyser and the weights assigned to the plurality of categories, and an electronic sandbox, the electronic file placed in the electronic sandbox if the risk assessment for the file does not exceed a pre-determined threshold, wherein the system is operative to deliver the electronic file to a second user if an observed operation of the electronic sand box indicates that the electronic file is not a threat.

An embodiment of the invention includes a method, comprising: receiving an electronic file; analysing the electronic file using a plurality of checks to determine if the electronic file conforms to an expected format, the plurality of checks organized into a plurality of categories; determining a weight for each of the plurality of categories; and calculating a final risk assessment of the electronic file using the plurality of categories and the weights assigned to each of the plurality of categories.

An embodiment of the invention includes a method, comprising: receiving an electronic file; analysing the electronic file using a plurality of checks from one of a plurality of categories to determine if the electronic file conforms to an expected format, the plurality of checks organized into a plurality of categories; determining a weight for each of the plurality of checks from one of the plurality of categories; and calculating a final risk assessment of the electronic file using the plurality of checks from the one of the categories and the second weights assigned to each of the plurality of checks.

An embodiment of the invention includes a method, comprising: receiving the weight assigned to each of the plurality of categories from a user; receiving an electronic file; analysing the electronic file using a plurality of checks to determine if the electronic file conforms to an expected format, the plurality of checks organized into a plurality of categories; determining a weight for each of the plurality of categories; and calculating a final risk assessment of the electronic file using the plurality of categories and the weights assigned to each of the plurality of categories.

An embodiment of the invention includes a method, comprising: receiving an electronic file; analysing the electronic file using a plurality of checks to determine if the electronic file conforms to an expected format, the plurality of checks organized into a plurality of categories; determining a weight for each of the plurality of categories, including receiving a default weight to assign to each of the plurality of categories; and calculating a final risk assessment of the electronic file using the plurality of categories and the weights assigned to each of the plurality of categories.

An embodiment of the invention includes a method, comprising: receiving an electronic file; analysing the electronic file using a plurality of checks to determine if the electronic file conforms to an expected format, the plurality of checks organized into a plurality of categories; determining a weight for each of the plurality of categories, including receiving a default weight to assign to each of the plurality of categories, and adjusting the default weight assigned to each of the plurality of categories according to instruction from a user; and calculating a final risk assessment of the electronic file using the plurality of categories and the weights assigned to each of the plurality of categories.

An embodiment of the invention includes a method, comprising: receiving an electronic file; analysing the electronic file using a plurality of checks to determine if the electronic file conforms to an expected format, the plurality of checks organized into a plurality of categories; determining a weight for each of the plurality of categories, including receiving a default weight to assign to each of the plurality of categories; and calculating a final risk assessment of the electronic file using the plurality of categories and the weights assigned to each of the plurality of categories, wherein receiving a default weight to assign to each of the plurality of categories includes receiving a first corpus of files with known non-conformities and a second corpus of safe files, scanning the first corpus of files to produce a first result and the second corpus of files to produce a second result, statistically analysing the first result and the second result, and using the analysis of the first result and the second result to adjust the default weight assigned to each of the plurality of categories so that a first calculated risk assessment for the first corpus of files is higher than a second calculated risk assessment for the second corpus of files.

An embodiment of the invention includes a method, comprising: receiving an electronic file; analysing the electronic file using a plurality of checks to determine if the electronic file conforms to an expected format, the plurality of checks organized into a plurality of categories; determining a weight for each of the plurality of categories; calculating a final risk assessment of the electronic file using the plurality of categories and the weights assigned to each of the plurality of categories; and using the final risk assessment of the electronic file to adjust the weights assigned to each of the plurality of categories.

An embodiment of the invention includes a method, comprising: receiving an electronic file; analysing the electronic file using a plurality of checks to determine if the electronic file conforms to an expected format, the plurality of checks organized into a plurality of categories; determining a weight for each of the plurality of categories; and calculating a final risk assessment of the electronic file using the plurality of categories and the weights assigned to each of the plurality of categories, including calculating a threat score for the electronic file using the plurality of categories and the weights assigned to each of the plurality of categories, comparing the threat score with a threshold score, and if the threat score exceeds the threshold score determining that the electronic file is likely not a threat and delivering the electronic file to a user.

An embodiment of the invention includes a method, comprising: receiving an electronic file; analysing the electronic file using a plurality of checks to determine if the electronic file conforms to an expected format, the plurality of checks organized into a plurality of categories; determining a weight for each of the plurality of categories; and calculating a final risk assessment of the electronic file using the plurality of categories and the weights assigned to each of the plurality of categories, including calculating a threat score for the electronic file using the plurality of categories and the weights assigned to each of the plurality of categories, comparing the threat score with a threshold score, if the threat score exceeds the threshold score determining that the electronic file is likely not a threat and delivering the electronic file to a user, and if the threat score does not exceed the threshold score, determining that the electronic file is likely a threat.

An embodiment of the invention includes a method, comprising: receiving an electronic file; analysing the electronic file using a plurality of checks to determine if the electronic file conforms to an expected format, the plurality of checks organized into a plurality of categories; determining a weight for each of the plurality of categories; calculating a final risk assessment of the electronic file using the plurality of categories and the weights assigned to each of the plurality of categories, including calculating a threat score for the electronic file using the plurality of categories and the weights assigned to each of the plurality of categories, comparing the threat score with a threshold score, if the threat score exceeds the threshold score determining that the electronic file is likely not a threat and delivering the electronic file to a user, and if the threat score does not exceed the threshold score, determining that the electronic file is likely a threat, wherein determining that the electronic file is likely a threat includes placing the electronic file in a sandbox, detonating the electronic file in the sandbox, and observing the operation of the sandbox after detonating the electronic file.

An embodiment of the invention includes a method, comprising: receiving an electronic file; analysing the electronic file using a plurality of checks to determine if the electronic file conforms to an expected format, the plurality of checks organized into a plurality of categories; determining a weight for each of the plurality of categories; calculating a final risk assessment of the electronic file using the plurality of categories and the weights assigned to each of the plurality of categories, including calculating a threat score for the electronic file using the plurality of categories and the weights assigned to each of the plurality of categories, comparing the threat score with a threshold score, if the threat score exceeds the threshold score determining that the electronic file is likely not a threat and delivering the electronic file to a user, and if the threat score does not exceed the threshold score, determining that the electronic file is likely a threat, wherein determining that the electronic file is likely a threat includes placing the electronic file in a sandbox, detonating the electronic file in the sandbox, observing the operation of the sandbox after detonating the electronic file, and if the observed operation of the sandbox indicates that the electronic file is not a threat, delivering the electronic file to the user.

An embodiment of the invention includes a tangible computer-readable medium storing non-transitory instruction that, when executed by a machine, implement the method of receiving an electronic file; analysing the electronic file using a plurality of checks to determine if the electronic file conforms to an expected format, the plurality of checks organized into a plurality of categories; determining a weight for each of the plurality of categories; and calculating a final risk assessment of the electronic file using the plurality of categories and the weights assigned to each of the plurality of categories.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as can come within the scope and spirit of the following claims and equivalents thereto.

What is claimed is:

1. A system, comprising:
   a computer;
   a memory in the computer;
      a database stored in the memory, the database including:
      a plurality of checks organized into a plurality of categories; and
   for each of the plurality of categories, a weight assigned to the category, including default weights assigned to the plurality of categories;
   a receiver to receive an electronic file;
   an analyser to analyse a first corpus of files with known non-conformities to produce a first result and to analyse a second corpus of safe files to produce a second result, and to analyse the electronic file using the plurality of checks in the database;
   a statistical analyser to statistically review the first result and the second result and to adjust the default weights assigned to the plurality of categories so that a first calculated risk assessment for the first corpus of files is higher than a second calculated risk assessment for the second corpus of files; and
   a threat calculator to calculate a risk assessment for the electronic file using a result from the analyser and the weights assigned to the plurality of categories,
   wherein when the risk assessment indicates that the electronic file is likely a threat, the electronic file can be detonated in an electronic sandbox.

2. A system according to claim 1, wherein:
   the database further includes for each of the plurality of checks, a second weight assigned to the check; and the threat calculator is operative to calculate the risk assessment for the electronic file using the result from the analyser and the second weights assigned to the plurality of checks.

3. A system according to claim 1, wherein the receiver is operative to receive the weights assigned to the plurality of categories from a user.

4. A system according to claim 1, wherein:
the weights assigned to the plurality of categories include default weights assigned to the plurality of categories; and
the receiver is operative to receive second weights from a user to assign to the plurality of categories.

5. A system according to claim 1, further comprising a statistical analyser to use the result from the analyser adjust the weights.

6. A system according to claim 1, wherein the system is operative to deliver the electronic file to a second user when the calculated risk assessment is greater than a pre-determined threshold.

7. A system according to claim 1, further comprising the electronic sandbox, the electronic file placed in the electronic sandbox when the risk assessment for the file does not exceed a pre-determined threshold.

8. A system according to claim 7, wherein the system is operative to deliver the electronic file to a second user when an observed operation of the electronic sand box indicates that the electronic file is not a threat.

9. A method, comprising:
receiving an electronic file;
analysing the electronic file using a plurality of checks to determine when the electronic file conforms to an expected format, the plurality of checks organized into a plurality of categories;
determining a weight for each of the plurality of categories, including:
receiving a default weight to assign to each of the plurality of categories;
receiving a first corpus of files with known non-conformities and a second corpus of safe files;
scanning the first corpus of files to produce a first result and the second corpus of files to produce a second result;
statistically analysing the first result and the second result; and
using the analysis of the first result and the second result to adjust the default weight assigned to each of the plurality of categories so that a first calculated risk assessment for the first corpus of files is higher than a second calculated risk assessment for the second corpus of files; and
calculating a final risk assessment of the electronic file using the plurality of categories and the weights assigned to each of the plurality of categories,
wherein when the final risk assessment indicates that the electronic file is likely a threat, the electronic file can be detonated in an electronic sandbox.

10. A method according to claim 9, wherein:
analysing the electronic file using a plurality of categories to determine when the electronic file conforms to an expected format includes analysing the electronic file using a second plurality of checks from one of the plurality of categories;
determining a weight for each of the plurality of categories includes determining a second weight for each of the second plurality of checks from the one of the plurality of categories; and
calculating a final risk assessment of the electronic file using the plurality of categories and the weights assigned to each of the plurality of categories includes calculating the final risk assessment of the electronic file using the plurality of checks from the one of the plurality of categories and the second weights assigned to each of the plurality of checks.

11. A method according to claim 9, further comprising receiving the weight assigned to each of the plurality of categories from a user.

12. A method according to claim 9, wherein determining a weight for each of the plurality of categories further includes adjusting the default weight assigned to each of the plurality of categories according to instruction from a user.

13. A method according to claim 9, further comprising using the final risk assessment of the electronic file to adjust the weights assigned to each of the plurality of categories.

14. A method according to claim 9, wherein calculating a final risk assessment of the electronic file using the plurality of categories and the weights assigned to each of the plurality of categories includes:
calculating a threat score for the electronic file using the plurality of categories and the weights assigned to each of the plurality of categories;
comparing the threat score with a threshold score; and
when the threat score exceeds the threshold score:
determining that the electronic file is likely not a threat; and
delivering the electronic file to a user.

15. A method according to claim 14, wherein calculating a final risk assessment of the electronic file using the plurality of categories and the weights assigned to each of the plurality of categories further includes, when the threat score does not exceed the threshold score, determining that the electronic file is likely a threat.

16. A method according to claim 15, wherein determining that the electronic file is likely a threat includes:
placing the electronic file in the sandbox;
detonating the electronic file in the sandbox; and
observing the operation of the sandbox after detonating the electronic file.

17. A method according to claim 16, wherein determining that the electronic file is likely a threat further includes, when the observed operation of the sandbox indicates that the electronic file is not a threat, delivering the electronic file to the user.

18. A tangible computer-readable medium storing non-transitory instructions that, when executed by a machine, result in:
receiving an electronic file;
analysing the electronic file using a plurality of checks to determine when the electronic file conforms to an expected format, the plurality of checks organized into a plurality of categories;
determining a weight for each of the plurality of categories, including:
receiving a default weight to assign to each of the plurality of categories;
receiving a first corpus of files with known non-conformities and a second corpus of safe files;
scanning the first corpus of files to produce a first result and the second corpus of files to produce a second result;
statistically analysing the first result and the second result; and
using the analysis of the first result and the second result to adjust the default weight assigned to each of the plurality of categories so that a first calculated risk assessment for the first corpus of files is higher than a second calculated risk assessment for the second corpus of files; and calculating a final risk assessment of the electronic file using the plurality of categories and the weights assigned to each of the plurality of categories,
wherein when the final risk assessment indicates that the electronic file is likely a threat, the electronic file can be detonated in an electronic sandbox.

\* \* \* \* \*